United States Patent [19]

Smith

[11] Patent Number: 4,780,983

[45] Date of Patent: Nov. 1, 1988

[54] FISHING ROD STORAGE APPARATUS

[76] Inventor: Michael W. Smith, 2940 NE. 121st, Portland, Oreg. 97220

[21] Appl. No.: 170,940

[22] Filed: Mar. 21, 1988

[51] Int. Cl.4 ............................................. A01K 97/00
[52] U.S. Cl. ....................................... 43/54.1; 43/57.1
[58] Field of Search ................ 43/25, 25.2, 54.1, 57.1, 43/57.2, 57.3; 2/DIG. 6; 206/315.1; 24/306

[56] References Cited

U.S. PATENT DOCUMENTS

| | | | |
|---|---|---|---|
| 3,113,363 | 12/1963 | Fyvie | 43/25 |
| 3,169,290 | 2/1965 | Snodgrass | 43/25 |
| 3,199,243 | 8/1965 | Caston | 43/25.2 |
| 3,425,150 | 2/1969 | Braese | 43/25.2 |
| 3,841,648 | 10/1974 | Meyer | 24/306 |
| 3,994,048 | 11/1976 | Rosenthal | 24/306 |
| 4,639,980 | 2/1987 | Peterson | 24/306 |
| 4,640,039 | 2/1987 | O'Neil | 43/54.1 |
| 4,691,469 | 9/1987 | Alsobrook et al. | 43/54.1 |
| 4,706,914 | 11/1987 | Ground | 24/306 |

Primary Examiner—M. Jordan
Attorney, Agent, or Firm—Henderson & Sturm

[57] ABSTRACT

The present invention is composed of a pair of flexible straps having hook and loop fasteners thereon for attaching sections of a fishing rod together. The arrangement of hook and loop are design to handle the difference in sizes of the rod sections while keeping the rods sections apart in storage.

1 Claim, 1 Drawing Sheet

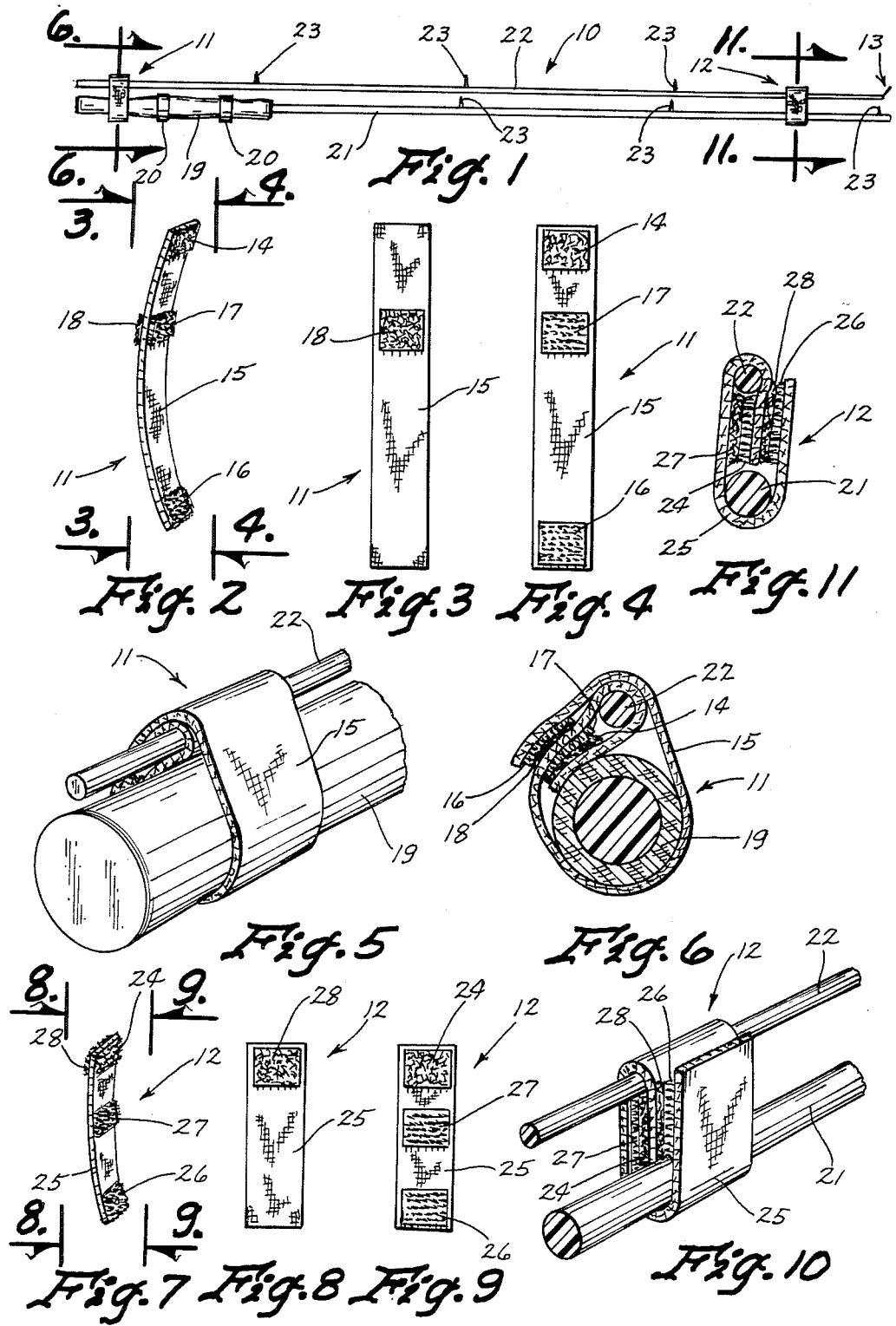

FISHING ROD STORAGE APPARATUS

TECHNICAL FIELD

The present invention relates generally to an apparatus for holding a multiple piece fishing rod together for storage purposes and more particularly to a pair of flexible straps having hook and loop fasteners thereon designed for such purpose.

BACKGROUND ART

Fishing rods quite often are made in more than one section so that they can be long enough to provide the proper fishing action while at the same time be short enough for carrying in an automobile or the like and to be more compact for storage and for transportation from place to place. While having a fishing rod in more than one section has certain advantages, there are also disadvantages such as the problem of carrying loose rods from place to place, especially when more than one rod is being carried. It is common place for sections of fishing rods to be dropped while being carried from place to place because of this problem. It is also a problem when storing fishing rods that the sections are in a state of disarray when the sections of a fishing rod are not connected together in some way.

Various solutions to the aforementioned problem have been proposed. For example, U.S. Pat. Nos. 3,113,363 to Fyvie, 3,169,290 to Snodgrass and 3,425,150 to Braese utilize molded, flexible connection members for connecting fishing rod sections together. While these inventions are designed to have some range of universality, it is a necessarily small range of adaptability to various rod sizes which are accommodated by use of these devices. Such devices simply are not very adjustable to accommodate rods having a great range of sizes in the shaft thereof.

U.S. Pat. No. 3,199,243 to Caston is more universal in accepting a large range of rod diameter sizes but it is unduly complex, expensive and bulky.

Accordingly, there is a need for a fishing rod storage apparatus which will overcome the aforementioned shortcomings of the prior art.

DISCLOSURE OF THE INVENTION

The present invention utilizes a pair of flexible straps having hook and loop fasteners thereon for attaching sections of a fishing rod together.

An object of the present invention is to provide an improved fishing rod storage apparatus.

Another object of the present invention is to provide a fishing rod storage apparatus having a large range of adaptability, making it very universal for rods having various diameters and sizes.

A further object of the present invention is to provide a fishing rod storage apparatus which is compact, inexpensive to manufacture, and simple to use.

Other objects, advantages, and novel features of the present invention will become apparent from the following detailed description of the invention when considered in conjunction with the accompanying drawings.

BRIEF DESCRIPTION OF THE DRAWINGS

FIG. 1 is a side elevational view of a two-piece fishing rod having fishing rod storage straps constructed in accordance with the present invention attached thereto in the storage position thereof;

FIG. 2 is a perspective view of a first flexible strap having hook and loop or VELCRO brand fasteners attached thereto for connecting the handle portion of a fishing pole to another section of the fishing pole which has been disassembled;

FIG. 3 is a view of one side of the strap shown in FIG. 2;

FIG. 4 is a view of the opposite side of the strap of FIG. 2 from that shown in FIG. 3;

FIG. 5 is a perspective view of the strap shown in FIGS 2-4 shown attached to a fishing rod as shown in the left portion of FIG. 1;

FIG. 6 is a cross-sectional view taken along line 6—6 of FIG. 1 and showing the flexible strap and hook and loop fasteners attaching the handle portion of the fishing rod to another portion thereof in the storage position of the fishing rod;

FIG. 7 is perspective view of a second flexible strap having hook and loop fasteners attached thereto;

FIG. 8 is a view of one side of the flexible strap shown in FIG. 7;

FIG. 9 is a view of the opposite side of the strap of FIG. 7 from that which is shown in FIG. 8;

FIG. 10 is an enlarged perspective view of the strap shown in FIGS. 7-9 shown connecting the fishing rod of FIG. 1 on the right side of FIG. 1; and FIG. 11 is an enlarged cross-sectional view taken along line 11—11 of FIG. 1.

BEST MODE FOR CARRYING OUT THE INVENTION

Referring now to the drawings wherein like reference numerals designate identical or corresponding parts throughout the several views, FIG. 1 shows a fishing rod (10) having a first flexible storage strap apparatus (11) connected to one end thereof and a second fishing rod storage strap apparatus (12) connected to the other end thereof.

Referring to FIGS. 2-4, it is noted that a first hook containing section (14) is connected to one end of a nylon strap (15), such as by being sewn thereon. Similarly, a first loop containing VELCRO fastener (16) is sewn to one side of the other end of the nylon strap (15). A second loop containing section (17) is sewn to the nylon strap (15) and a second hook containing section (18) is sewn to the other side of the nylon strap (15) directly opposite the second loop containing section (17).

Referring now to FIGS. 7-9, it is noted that a second attachment structure (12) includes a nylon strap (25) which is shorter than the nylon strap (15) shown in FIG. 2. The nylon strap (25) has a third hook containing section (24) sewn to one end of one side thereof and a fourth hook containing portion (28) sewn to the other side thereof opposite to the third hook containing section (24) as is clearly shown in FIG. 7. A third loop containing section (26) is sewn to the other end of the one side of the nylon strap (25) and a fourth loop containing section (27) is sewn to the same side thereof between the third hook containing section (24) and the third loop containing section (26) as is clearly shown in FIG. 7 and 9.

In operation, the fishing rod (10) shown in FIG. 1 has a handle portion (19) with sliding metal rings (20) thereon for attachment to a fishing reel or the like. A first portion (21) of the fishing rod (10) is rigidly attached to the handle (19) and is telescopically adapted to receive a second portion (22) of the fishing rod by having the right end of section (21) extend into a hollow left end of the second portion (22) or, vice versa, the left end of the second section (22) extending into a hollowed out portion in the right end of the first portion (21). Such telescoping construction is conventional in the fishing rod industry. Metal eyelet loops (23) are connected to the first and second portions (21 and 22) of the fishing rod (10) as is conventional and a tip loop (13) is also attached to the right end of the second portion of the fishing rod (22) as is shown in FIG. 1.

When it is desired to use the fishing rod (10), the fishing rod storage straps (11 and 12) are removed by simply pulling the hook and loop fasteners apart from the position shown in FIGS. 1, 5, 6 and 11 so that the first and second portions (21 and 22) are telescoped together to essentially make a long one-piece fishing rod. The rod (10) can be used in a conventional fashion.

When it is time to discontinue use of the fishing rod (10), the sections (21 and 22) would be placed in the position shown in FIG. 1 and the strap (11) would be wrapped around the handle (19) and the second section (22) in the position shown in FIGS. 1, 5 and 6 so as to hold the left end of the fishing rod (10) as shown in FIG. 1 securely together for storage and transportation from place to place. Similarly, the second fishing rod storage strap (12) would be moved to the position shown in FIGS. 1, 10 and 11 to hold the first and second fishing rod portions (21 and 22) together for storage and for transportation from place to place. To further tighten the sections (21 and 22), the strap (12) can be pushed to the left from the position shown in FIG. 1 and the strap (11) pushed to the right as viewed in FIG. 1.

Accordingly it will be appreciated that the fishing rod storage apparatus disclosed above does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:
1. Apparatus comprising:
a fishing rod including a handle for receiving a reel, a first bendable portion attached at one end thereof to and extending from said handle, said handle being larger in diameter than said first bendable portion, a second bendable portion, means on one end of said second bendable portion for selective attachment to said one end of the first bendable portion whereby said first and second portions can be effectively connected together for use as a fishing pole or disconnected for storage or for transportation from place to place;
a first flexible strap means for connecting the handle to said second portion of the fishing pole when said first and second portions are in the unconnected, storage position, said first flexible strap means including hook and loop fastener means for attachment to said handle and to said second portion said hook and loop fastener means including:
a first hook containing section attached to one side of one end of said first flexible strap means;
a first loop containing section connected to said one side of the other end of said first flexible strap means;
a second loop containing section connected to said one side of said first flexible strap means and being positioned closer to said first hook means than to said first loop means, said first flexible strap means extending around said second portion of said fishing rod and said first hook containing section being in engagement with said second loop containing section;
a second hook containing section connected to the other side of said first flexible strap means at a position directly on the other side from said second loop containing section, said first flexible strap means extending around said handle and said first loop containing section being in engagement with said second hook containing section when said fishing rod is in the storage position thereof;
a second flexible strap means for connecting the first portion of the fishing rod to the second portion thereof in the storage position thereof, said second flexible strap means including hook and loop fasteners including:
a third hook containing section attached to one end of one side of said second flexible strap means;
a fourth hook containing section attached to the other side of said one end of said second flexible strap means;
a third loop containing section attached to the other end of said one side of said second flexible strap means and attached to said fourth hook containing section when said second flexible strap means is disposed around said first portion of said fishing rod in the storage position of said fishing rod; and
a fourth loop containing section attached to said one side of said second flexible strap mans at a position between the third hook containing section and the third loop containing section, said fourth loop containing section being attached to said third hook containing section when said second flexible strap means is disposed around said second portion of said fishing rod in the storage position of said fishing rod.

* * * * *